Oct. 27, 1964

KIICHI HAMANO 3,154,310

FLOATING OIL SEAL

Filed Oct. 21, 1963

Kiichi Hamano
INVENTOR.

BY George B. Aujevoch
Attorney

# United States Patent Office 3,154,310
Patented Oct. 27, 1964

3,154,310
FLOATING OIL SEAL
Kiichi Hamano, 1793 Umeda-cho, Adachi-ku,
Tokyo-to, Japan
Filed Oct. 21, 1963, Ser. No. 317,433
1 Claim. (Cl. 277—39)

This invention relates to an oil seal, and more particularly pertains to a floating oil seal wherein the inner and outer circumferences thereof are adapted for floating rotation without sticking to a sliding ring and shaft, thereby providing for improved sealing effect so that little friction will occur even during ultra-high speed rotation.

An important object of this invention is to provide a floating oil seal comprising a seal body made of plastic material having an inverted U-shaped or U-shaped section, a plurality of thin leaf-shaped shaft lips and thin leaf-shaped sliding ring lips projected upwards from the inner and outer circumferential sides of said seal body respectively, and one or more thin leaf-shaped shaft lips and thin leaf-shaped sliding ring lips projected downwards approximately at a right angle relative to the said lips respectively.

Figure 1:
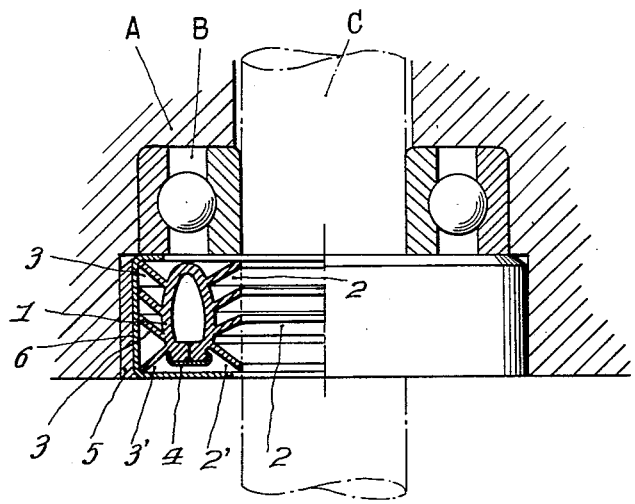
Figure 2:
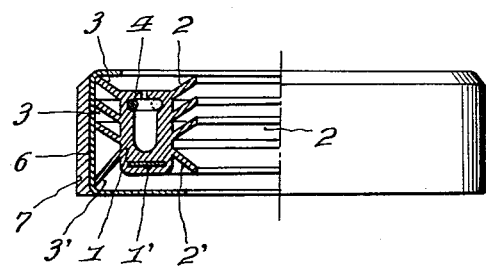

This invention will be now described in greater detail, by way of example, in conjunction with the accompanying drawings, in which:

FIG. 1 is a semi-diagrammatic sectional view of air-cushion type of floating oil seal in accordance with this invention; and FIG. 2 is a partial view taken in section of another air-cushion type of floating oil seal employing a coil-shaped spring in accordance with this invention.

Referring to FIG. 1, there is shown a floating oil seal adapted to produce close contact between the shaft and sliding ring, wherein a hollow seal body 1 made of a plastic material such as synthetic rubber has an inverted U-shaped section which is deformed into an O-shaped section by clamping the lower portions thereof by means of a metal ring 4, a plurality of parallel thin leaf-shaped shaft lips 2 are projected from the inner circumferential side of the said seal body 1 into slanting relationship thereto, one or more thin leaf-shaped lips 2' are projected downwards approximately at a right angle relative to the said lips 2, a plurality of thin leaf-shaped sliding ring lips 3 are projected upwards from the outer circumferential side of the said seal body 1 into slanting relationship thereto, and one or more thin leaf-shaped lips 3' are projected approximately at a right angle relative to the said lips 3. The end portions of the seal body 1 having inverted U-shaped section are fitted with the metal ring 4 so that the said seal body 1 is provided with O-shaped section by clamping the end portions thereof by means of the said metal ring 4, thereby hermetically filling air therewithin so as to provide the seal body with the resiliency of the hermetically filled air. The seal body described above is accommodated in a sliding ring 6 of L-shaped section which has a cushion rubber 5 fixedly attached to the outer wall thereof.

FIG. 2 shows another floating oil seal embodying this invention which is adapted to provide close contact between the shaft and sliding ring by providing the seal body with resiliency by means of a coil-shaped spring. In this embodiment, a seal body 1 made of a plastic material such as synthetic rubber is U-shaped in section and which has a reinforcing ring 1' embedded adjacent the bottom thereof. As previously shown in FIG. 1, upward thin leaf-shaped shaft lips 2 and 2' and downward thin leaf-shaped shaft lips 3 and 3' are projected from the inner and outer sides of the said U-shaped seal body 1 having the coil shaped spring 4 inserted therein so as to compress the inner side from the opposite ends of the U-shaped seal body. The seal body just described is also accommodated in a sliding ring 7 of L-shaped section having a cushion rubber 7 fixed to the outside thereof.

In the both types of oil seal shown in FIGS. 1 and 2, a ball-bearing means B is provided in a housing A, and the sliding ring of L-shaped section having the seal body accommodated therein is inserted just beneath the ball-bearing means B as viewed is FIG. 1, so that the lips 2 and 2' are disposed into close contact with the shaft C while the lips 3 and 3' are disposed into close contact with the inner side of either the sliding ring 6 having L-shaped section or the sliding ring 7 having also L-shaped section as shown in FIG. 2. Thus, the inner and outer circumferences of the seal body can perform floating rotation without sticking to the sliding ring and shaft.

In accordance with this invention, as shown and described above, there are provided thin leaf-shaped lips 2, 2' and 3, 3' projected approximately at right angle relative to said seal body so that the said lips 2, 2' and 3, 3' may be easily flexed, and thus the lips 2 and 2' and the lips 3 and 3' are adapted to be compressed each with the other so that the end portions thereof will closely contact the shaft surface and the inner surface of the sliding ring, while at the same time the ends of the respective lips maintain close contact with the shaft and sliding ring in such a manner that they are well adaptable to the vibration movement of the shaft, so that the seal body 1 will normally assume the intermediate position so as to control the flexure of the thin leaf-shaped lips in the inner and outer sides and which is adapted for floating rotation thus accomplishing sealing purpose, and little friction will occur therein even during rotation of such an ultra-high speed as 9000–10000 r.p.m.

What I claim is:

An annular seal body made of plastic material having an inverted U-shaped cross section adapted to be deformed into an O-shaped section by clamping the lower portions thereof by means of a metal ring having a U-shaped cross section, a plurality of thin leaf-shaped lips projecting upwardly in parallel relation from the inner and outer circumferential sides of said body and one or more leaf-shaped lips projecting downwardly from seal body at the inner and outer circumferential sides of the body.

References Cited in the file of this patent
UNITED STATES PATENTS 2,417,107   Greguire _____ Mar. 11, 1947
3,022,081   Kosatka _____ Feb. 20, 1962